United States Patent
Yan et al.

(10) Patent No.: US 10,372,302 B2
(45) Date of Patent: Aug. 6, 2019

(54) DIMENSION BASED DYNAMIC DETERMINATION OF VISUAL ANALYTICS

(71) Applicants: Sui Yan, Mountain View, CA (US); Xiaojun Feng, Palo Alto, CA (US); Harish Tyagi, Cupertino, CA (US)

(72) Inventors: Sui Yan, Mountain View, CA (US); Xiaojun Feng, Palo Alto, CA (US); Harish Tyagi, Cupertino, CA (US)

( * ) Notice: Subject to any disclaimer, the term of this patent is extended or adjusted under 35 U.S.C. 154(b) by 582 days.

(21) Appl. No.: 14/014,062

(22) Filed: Aug. 29, 2013

(65) Prior Publication Data

US 2015/0067565 A1    Mar. 5, 2015

(51) Int. Cl.
| | |
|---|---|
| G06F 16/00 | (2019.01) |
| G06F 3/0484 | (2013.01) |
| G06F 16/26 | (2019.01) |
| G06Q 90/00 | (2006.01) |
| G06T 11/20 | (2006.01) |

(52) U.S. Cl.
CPC ............ *G06F 3/0484* (2013.01); *G06F 16/26* (2019.01); *G06Q 90/00* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 5,751,958 A * | 5/1998 | Zweben ............ | G06F 17/30356 707/999.008 |
| 6,750,864 B1 | 6/2004 | Anwar | |
| 6,995,768 B2 | 2/2006 | Jou et al. | |
| 7,421,648 B1 * | 9/2008 | Davis ................ | G06F 17/30882 707/E17.013 |
| 7,716,592 B2 | 5/2010 | Tien et al. | |
| 7,730,023 B2 | 6/2010 | MacGregor | |
| 8,725,775 B2 | 5/2014 | Gong et al. | |
| 8,732,696 B2 | 5/2014 | Bukary | |
| 2002/0070953 A1 | 6/2002 | Barg et al. | |
| 2008/0180458 A1 | 7/2008 | Favart et al. | |
| 2008/0192056 A1 * | 8/2008 | Robertson ............... | G06T 13/80 345/440 |
| 2009/0252436 A1 | 10/2009 | Eidenzon et al. | |
| 2011/0153548 A1 | 6/2011 | Varghese et al. | |
| 2013/0038612 A1 | 2/2013 | Hanumara et al. | |

(Continued)

*Primary Examiner* — Son T Hoang

(74) *Attorney, Agent, or Firm* — Fountainhead Law Group P.C.

(57) ABSTRACT

Alternative visual analytics for a particular business object are determined in response to user requests to change the dimensions of a previously generated visual analytic. By analyzing the request to change the dimensions, an alternative visual analytic pattern that includes suitably dimensioned visualizations is determined. The alternative visual analytic pattern includes a description of a particular visualization and defines how to generate a corresponding visual analytic. Based on the alternative visual analytic pattern, a modified report definition can be generated. The modified report definition, that includes analytical operations with dimensions corresponding to the request, can be executed on the business object to generate modified analytic data. A new modified visual analytic that comprises a visual representation of the modified analytic data is then generated based on the alternative visual analytic pattern.

15 Claims, 8 Drawing Sheets

(56) References Cited

U.S. PATENT DOCUMENTS

| | | | |
|---|---|---|---|
| 2013/0111321 A1* | 5/2013 | Dorrell | G06F 17/30 |
| | | | 715/215 |
| 2013/0185624 A1* | 7/2013 | Appleyard | G06Q 10/10 |
| | | | 715/234 |
| 2013/0297588 A1 | 11/2013 | Tyagi | |
| 2014/0059109 A1 | 2/2014 | Jugel | |
| 2014/0082540 A1 | 3/2014 | Armitage | |
| 2014/0157170 A1 | 6/2014 | Elias | |
| 2015/0067556 A1* | 3/2015 | Tibrewal | G06F 17/30598 |
| | | | 715/765 |

* cited by examiner

DIMENSION BASED DYNAMIC DETERMINATION OF VISUAL ANALYTICS

BACKGROUND

Unless otherwise indicated herein, the approaches described in this section are not prior art to the claims in this application and are not admitted to be prior art by inclusion in this section.

The present invention relates to the analysis of business information, and in particular to automatic updates and alterations to the representation of the visual analytic data when a user requests a change to the type or number of dimensions shown.

Many types of business information are used on a daily basis by a wide variety of user types within the context of various business systems, such as customer relationship management (CRM), enterprise resource planning (ERP), and other similar systems. For example, a typical business system may include a number of transaction and analytic databases on which an analytical engine can execute various analytical operations of a specific report definition to generate a corresponding report. Many of such databases include information in the form of business objects that include the underlying business data (i.e. transaction and analytic data). The resulting report may include the analysis of the underlying business object based on the specification of one or more dimensions in the report definition. The dimensions of a particular report definition may specify the aggregation and filtering of business information in the business object according to a number of variables. For example, a business object may be analyzed according to a report definition to generate quarterly total sales for each member of a particular sales team. Accordingly, the sales data may be filtered for sales data associated with members of the particular sales team, and then aggregated over the quarter of interest. In such scenarios, the dimensions of the report definition at least include the total sales, the employees, and the specific fiscal quarter of interest.

While the resulting report may include information that is useful to some users, the utility of the analytical data in resulting report may be increased for a wider audience of users by generating a visual representation of the analysis of the underlying business object. The visual representations, or visualizations, of the analytic data of a report typically include graphs, charts, tables, numerics, and the like. The visualizations provide quick and easily consumable representations of the analytic data that can quickly and concisely portray specific details about the underlying business objects. To further increase the accessibility of the analytic data, some systems provide simplified and concise formats for the visualization of the analytic data. For example, some systems offer dashboards user interfaces (UIs) that provide a framework in which multiple visualizations are included in pre-formatted units. The preformatted units are often referred to herein as visual analytics. The visual analytics may include one or more visualizations of analytic data of an associated business object. FIG. 1 illustrates an example dashboard UI 110 that includes multiple visual analytics 120 that include visualizations 125 of analytic data of the underlying business objects 130. The business objects 130 are represented by dotted-line boxes to indicate the association with the visual analytics 120; however, the visual analytics 120 may or may not include an indication of the underlying business objects 130.

To further increase the utility of visual analytics 120 displayed in a dashboard UI 110, some systems provide controls and tools for end-users to customize the visualization 125 of the analytic data. For example, such systems include visual analytics 120 that allow a user to increase or decrease the number of dimensions by which the analytic data is displayed in the corresponding visualizations 125. While increasing or decreasing the dimensions of some visualizations types is simple, such as is the case with adding an additional row or column in a table, adding additional dimensions to other types of visualizations, such as bar graphs or pie graphs, may not be as straightforward or result in particularly useful results. Accordingly, when a user requests an alteration of the dimensions of a particular visualization 125 for a specific visual analytic 120, some systems typically default to displaying the data in a table. Alternatively, some systems attempt to add the additional dimensions to the original visualization type that often results in cluttered and often confusing visualizations 125.

Thus, there is a need for improved systems and methods for automatically generating alternative visual analytics to improve the accessibility and clarity of visualizations of analytic data in response to requests for changes in dimensions. The present invention addresses such limitations by automatically and dynamically generating alternative visualizations.

SUMMARY

Embodiments of the present invention include systems and methods for automatically determining alternative visual analytics in response to changes to dimensions of constituent visualizations. One embodiment includes a computer implemented method that includes receiving user input indicating a change in a dimension of a previously generated visual analytic.

The previously generated visual analytic may include a first visualization of analytic data resulting from execution of a report definition to a business object and the report definition may include a first plurality of analytical operations. Such methods may also include analyzing the user input to determine an alternative visual analytic pattern that defines a second visualization comprising the change in the dimension, and modifying the report definition based on the alternative visual analytic pattern to generate a modified report definition, that includes a second plurality of analytical operations, executing the modified report definition on the business object to generate modified analytic data, and generating an alternative visual analytic based on the alternative visualization pattern that includes the second visualization of the modified analytic data.

In one embodiment, the first visualization of analytic data includes a first dimension, and the user input indicating the change in dimension includes an indication of an addition of a second dimension.

In one embodiment, the first visualization of analytic data includes a first set of dimensions, the user input indicating the change in dimension includes an indication of a second set of dimensions, wherein the first set of dimensions and the second set of dimensions differ by at least one dimension.

In one embodiment, the method may further include sending the alternative visual analytic to a client computing device executing a dashboard user interface that provides a framework for a plurality of visual analytics comprising a plurality of visualizations of analytic data of a plurality of business objects in a business system.

In one embodiment, the modified report definition is transitory and is not persistent in the computer system comprising the business object.

In one embodiment, the modified analytic data comprises dimensions of data different from dimensions of data in the analytic data resulting from the execution of the report definition on the business object.

Another embodiment includes a non-transitory computer readable medium that includes instructions, that when executed by a computer processor cause the computer processor to be configured for receiving user input indicating a change in a dimension of a previously generated visual analytic. The previously generated visual analytic includes a first visualization of analytic data resulting from execution of a report definition to a business object, and the report definition includes a first plurality of analytical operations. The instructions can further cause the computer processor to be configured for analyzing the user input to determine an alternative visual analytic pattern, wherein the alternative visual analytic pattern defines a second visualization comprising the change in the dimension, and modifying the report definition based on the alternative visual analytic pattern to generate a modified report definition. The report definition may include a second plurality of analytical operations. The instructions may further cause the computer processor to be configured for executing the modified report definition on the business object to generate modified analytic data, and generating an alternative visual analytic, based on the alternative visualization pattern and including the second visualization of the modified analytic data.

Yet another embodiment includes a system having a computer processor and a non-transitory computer readable medium coupled to the processor and comprising instructions, that when executed by the computer processor cause the computer processor to be configured to receive user input indicating a change in a dimension of a previously generated visual analytic. The previously generated visual analytic may include a first visualization of analytic data resulting from execution of a report definition to a business object, and the report definition may include a first plurality of analytical operations. The instructions may further cause the computer processor to be configured to analyze the user input to determine an alternative visual analytic pattern. The alternative visual analytic pattern defines a second visualization comprising the change in the dimension. The instructions may further cause the computer processor to be configured to modify the report definition based on the alternative visual analytic pattern to generate a modified report definition that includes a second plurality of analytical operations, execute the modified report definition on the business object to generate modified analytic data, and generate an alternative visual analytic, based on the alternative visualization pattern, and including the second visualization of the modified analytic data.

The following detailed description and accompanying drawings provide a better understanding of the nature and advantages of the present invention.

DETAILED DESCRIPTION

Figure 1:
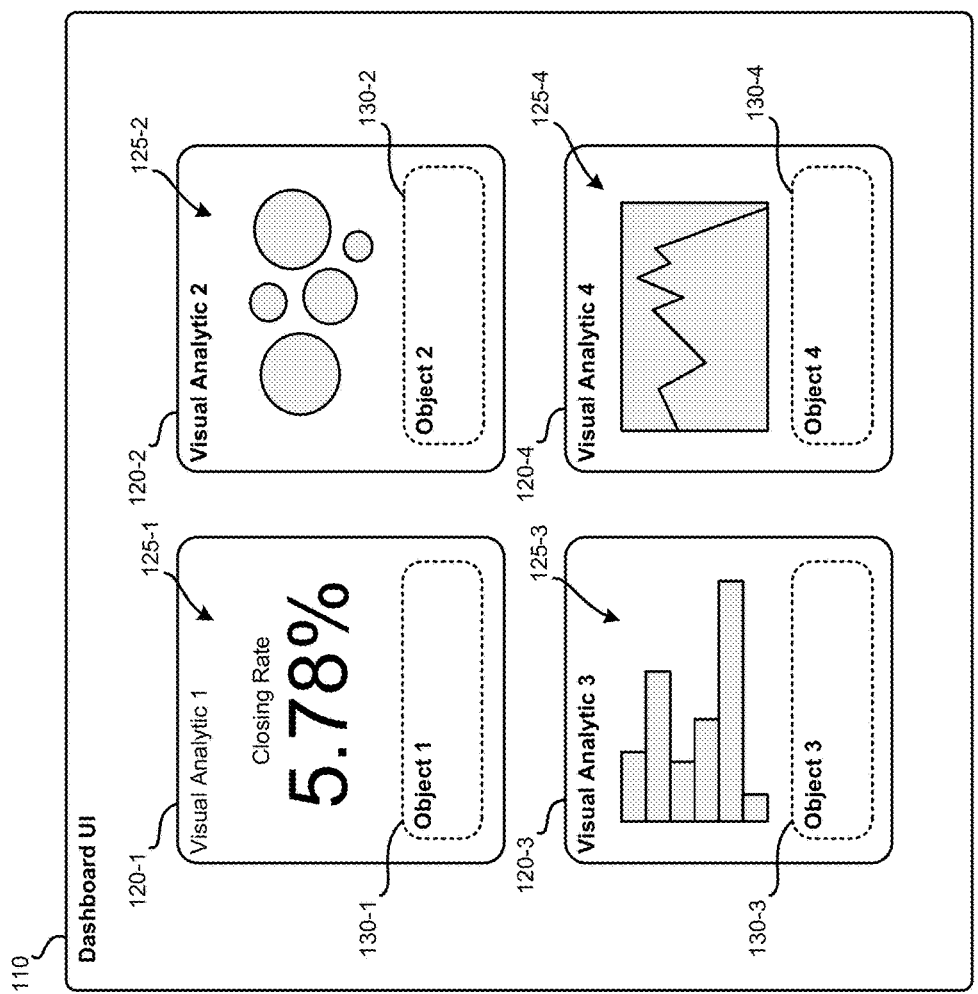
FIG. 1 illustrates a dashboard user interface that can be improved by various embodiments of the present disclosure.

Embodiments of the present disclosure include systems and methods for automatically responding to user requests to change the dimensions of visual representation of analytic data in a manner that produces visualizations with improved clarity and succinctness. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include techniques for systems and methods for dynamically and automatically determining and generating alternative visualizations of analytic data in response to end user requests for changes in dimensions of the previously generated visualizations. In some embodiments, centralized or distributed business systems may be accessed by a remote client computing devices executing a corresponding UI. The corresponding UI may include a visual analytic framework or dashboard, in which multiple individual visual analytics may be presented to an end-user. Each visualization may include one or more representations of analysis of a particular associated business object. The data resulting from the analysis of a business object is referred to herein as analytic data.

In response to a request from a user to change the dimensions of a particular visualization or visual analytic (e.g., increase or decrease the number or granularity of dimensions shown), embodiments of the present disclosure include analyzing the request to determine one or more possible alternative visualizations suitable for representing a visualization of the analytic data with the requested dimensions. Based on the analysis, embodiments may determine multiple alternative visual analytic patterns that specify suitable visualizations of analytic data. As used herein, the term "visual analytic pattern" refers to a model of a particular visual analytic that can be used to generate a specific visualization of underlying analytic data. The visual analytic pattern can include specifications for the number, type, and granularity of dimensions, as well as specifications for size, format, type, labeling, or layout of the visualization. Accordingly, a visual analytic pattern may specify a simple two-dimensional bar graph for showing expenses by product line with simple labeling of the products and dollar figures on appropriate axes. However, a visual analytic pattern may also define a more complex visualization having many dimensions that are compared in a number of ways. For example, a visual analytic pattern may include a definition of a bubble-graph that illustrates relative contributions of various groups to a particular project for a particular period of time by the size of the bubbles, while also illustrating the operating cost of each group by the color of the bubbles and collaborations among the groups using connecting lines. Such a visual analytic pattern may also include, for example, a definition of a legend or a key to aid the viewer.

Since the alternative visual analytic patterns may require additional or different analytic data relative to the analytic data represented in the previously generated visualization, embodiments of the present disclosure may include modifying the report definition that defined the analytical operations that generated the original analytic data. The modified report definition may include a set of new or modified analytical operations that can operate on the associated business object to generate the requested analytic data with the requested dimensions. Once the new analytic data generated according to the modified analytical operations is available, the corresponding visualization having the requested dimensions can be generated according to the alternative analytic pattern.

As used herein, the term "dimension" refers to a categorization by which the underlying data can be analyzed. Accordingly, any visualization of analytic data can include multiple dimensions. For example, the dimensions of a monthly revenue chart for a particular year would be monthly revenue and the months of the year (i.e., two dimensions). The dimensions of such a chart can be modified, increased or decreased. For example, in addition to the monthly revenue and months of the year, the dimension of employee (e.g., sales people) can be added to the monthly revenue chart to show the each employees' monthly revenue (i.e., three dimensions). In another example, the dimensions of the monthly employee revenue can be further increased to show the revenue by customer or product. Thus, the resulting graph would have dimensions of monthly revenue by employee and customer/product (i.e., five or six dimensions). Alternatively, the dimensions can be altered (e.g., a change in granularity) while maintaining the same number of dimensions. Instead of monthly time periods, the data can be analyzed and visualized by week or year, and instead of revenue by employee, the revenue can be analyzed by regional groups of employees (e.g., market regions).

Visual Analytic Dashboard and Controls

Figure 2:
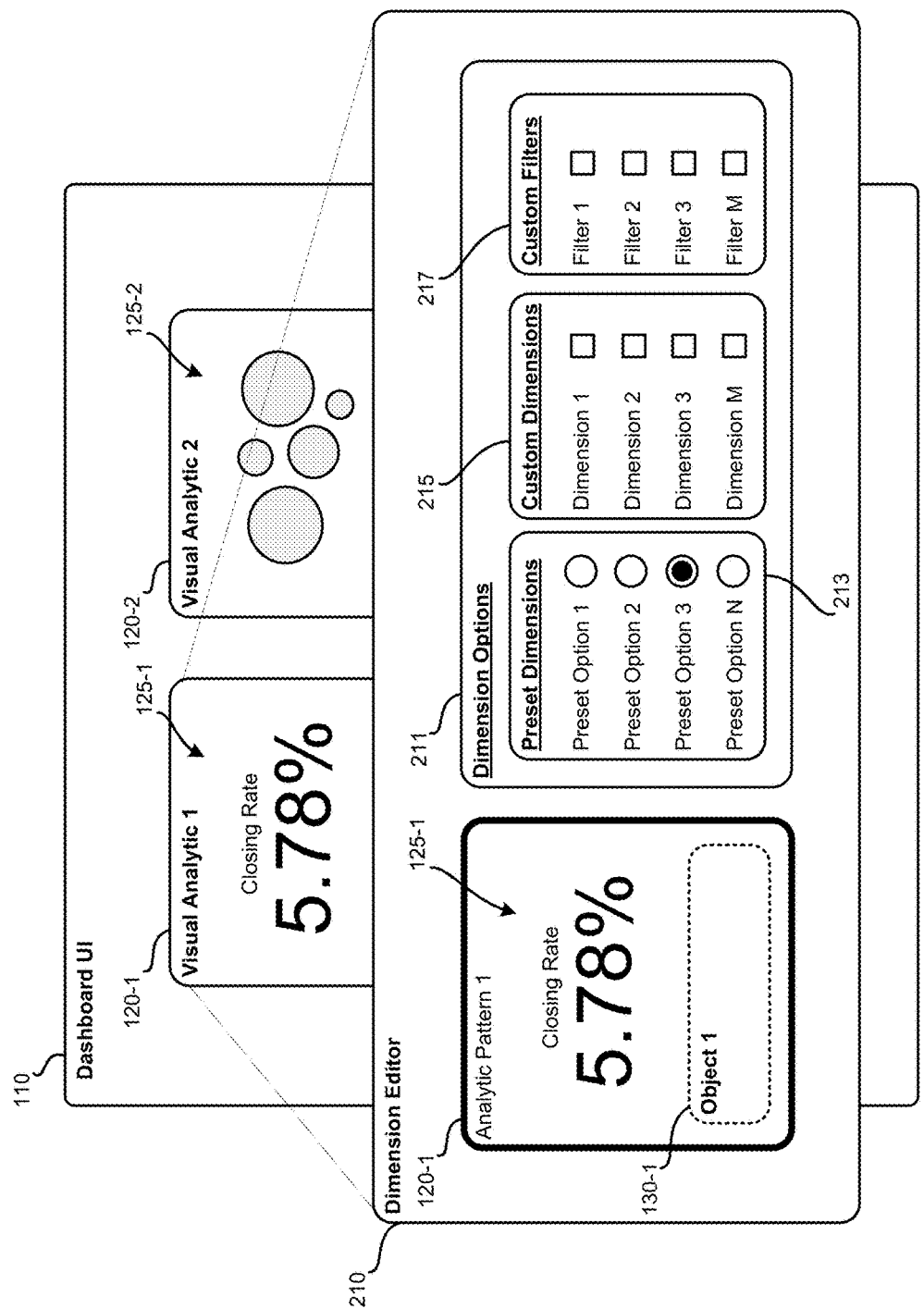
FIG. 2 illustrates a user interface that can be used to implement various embodiments of the present disclosure.

FIG. 2 illustrates an example dashboard UI 110 that includes controls for altering the dimensions of a selected visual analytic, according to various embodiments of the present disclosure. As shown, the visual analytic 120-1 may include a control that can be operated (i.e., selected by a user in a graphical user interface (GUI)) to invoke an additional user interface such as the dimension editor 210. The dimension editor 210 may include a representation of the original visual analytic 120-1, the associated visualization 125-1, and some indication of the associated business object 130-1. In some embodiments, the dimension editor 210 may also include controls 211 for requesting a change or customization of the dimensions of the visualization 125-1. The controls 211 may include various dimension options. For example, the dimension options may include a selection of preset options 213 that correspond to one or more predetermined alternative visual analytic patterns having dimensions that may or may not be suitable for representing the analytic data depicted by visualization 125-1. Controls 211 may also include controls 215 and 217 for specifying additional dimensions or filters to be applied to the analytic data and or the visual analytic 120-1. While the specific example shown, the dimension editor 210 includes various radio buttons and selection boxes, other embodiments of the present invention may also include other types of input mechanisms including, but not limited to, text fields, pull-down menus, scrollbars, and the like.

Figure 3:
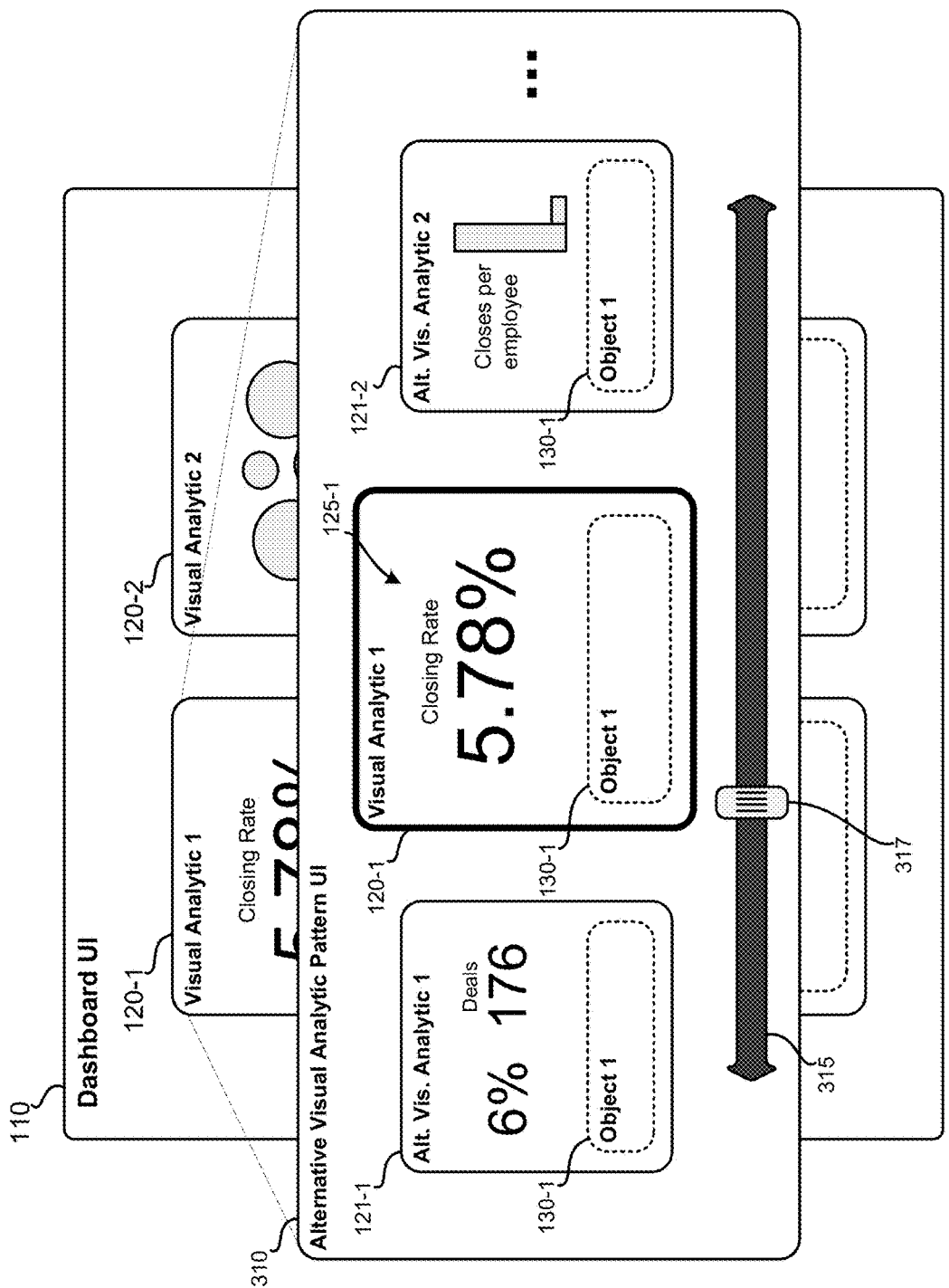
FIG. 3 illustrates a user interface that can be used to implement various embodiments of the present disclosure.

FIG. 3 illustrates another example dashboard UI 110 that includes controls for requesting alterations to the dimensions of a selected visual analytic, according to various embodiments of the present disclosure. As shown, the visual analytic 120-1 may include a controller that can be operated to invoke the alternative visual analytic pattern UI 310. In such embodiments, the alternative visual analytic pattern UI 310 may include a representation of the original visual analytic 120-1, as well as several other alternative visual analytics 121. The alternative visual analytics 121 may include representations or samples of other visualizations having the same or different dimensions as the visualizations 125-1 of the original visual analytic 120-1. The user may select one of the alternative visual analytics 121 by operating controls such as an arrow bar 315 or a slider tab 317. In the specific example shown in FIG. 3, the original visual analytic 120-1 includes a numeric metric of a "closing rate". This monodimensional numeric metric may represent an overall description of sales agreements for any number of salespeople across any number of customers during any period of time. Such a nondescript numeric metric may or may not be useful to particular end-user. Accordingly, an end-user may wish to customize the dimensions of the visualization 125-1 by increasing the dimensions and changing the visualization type. For example, the alternative visual analytic 121-1 illustrates a percentile closing rate rounded up to the nearest whole number as well as the total number of sales deals. The alternative visual analytic 121-2 depicts a bar graph that illustrates the number of closes per employee (e.g. salespersons). In either event, the alternative visual analytics 121 represent a change in dimensions of the visualization 125-1 that may or may not be supported by the underlying analytic data of the associated business objects 130-1.

Dimensions of Analytic Data and Modified Report Definitions

Figure 4:
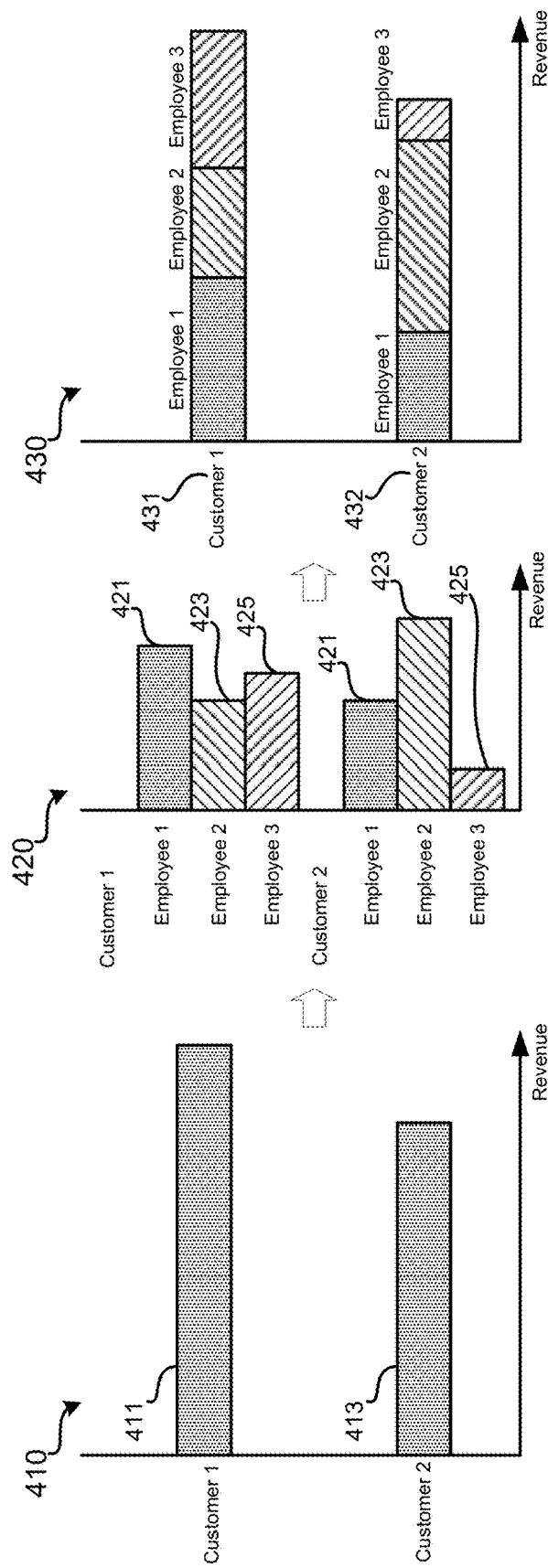
FIG. 4 illustrates previously generated and alternative visual analytics according to various embodiments of the present disclosure.

To further illustrate changes in dimensions of visual analytics, FIG. 4 illustrates one possible scenario in which a change in dimensions of a visual analytic can automatically trigger the determination of a more suitable visualization of the analytic data. The visualization 125 a particular visual analytic 121 may include graph 410. The graph 410 may include total revenue received by particular organization by customers 411 and 413. Since representation of the analytic data in graph 410 may be too high level with respect to the evaluation of individual employee performance, an end user may wish to add the dimension of employee to the graph. Graph 420 illustrates the simple addition of the employee dimensions 421, 423, and 425.

While the addition of the additional employee dimensions 421, 423, and 425, may be illustrative of the relative performance of each of the employees, the evaluation of the combined total revenue on a customer basis is lost in the clutter of the additional bars in the graph. Accordingly, embodiments of the present disclosure may include analyzing the request for the additional dimensions to generate alternative visualization patterns that generate more suitable and concise visual representations of the analytic data. For example, one possible alternative visualization pattern may include the specifications of a stacked bar graph such as that depicted as graph 430. Graph 430 includes stacked bars 431 and 433 corresponding to customers 1 and 2. Graph 430 illustrates the relative performance of each of the employees while maintaining a visualization of the total revenue on a per customer basis.

Visual analytic patterns that generate visualizations such as graph 430 may require analytic data that is unavailable in the analytic data originally generated for graph 410. For example, the graph 410 may only include analytic data generated according to a report definition that includes analytical operations, such as filters for revenue data and aggregations at the customer level. Accordingly, the analytic data generated by the original report definition may not include the analysis of the underlying business object necessary to produce the visualization of a suitable alternative visual analytic pattern having the requested dimensions. In such scenarios, embodiments of the present disclosure address this deficiency by analyzing the request to change the dimensions to determine which additional or different analytic data is necessary. Based on the determination of the additional analytic data, embodiments of the present disclosure may modify the original report definition to include the requisite or modified analytical operations. Once the modified report definition is generated, it can be operated on the underlying business object to generate the modified analytic data. Then, using the modified analytic data and the alternative visual analytic pattern, a modified visualization with the requested dimensions can be generated and displayed in the corresponding visual analytic.

Figure 5:
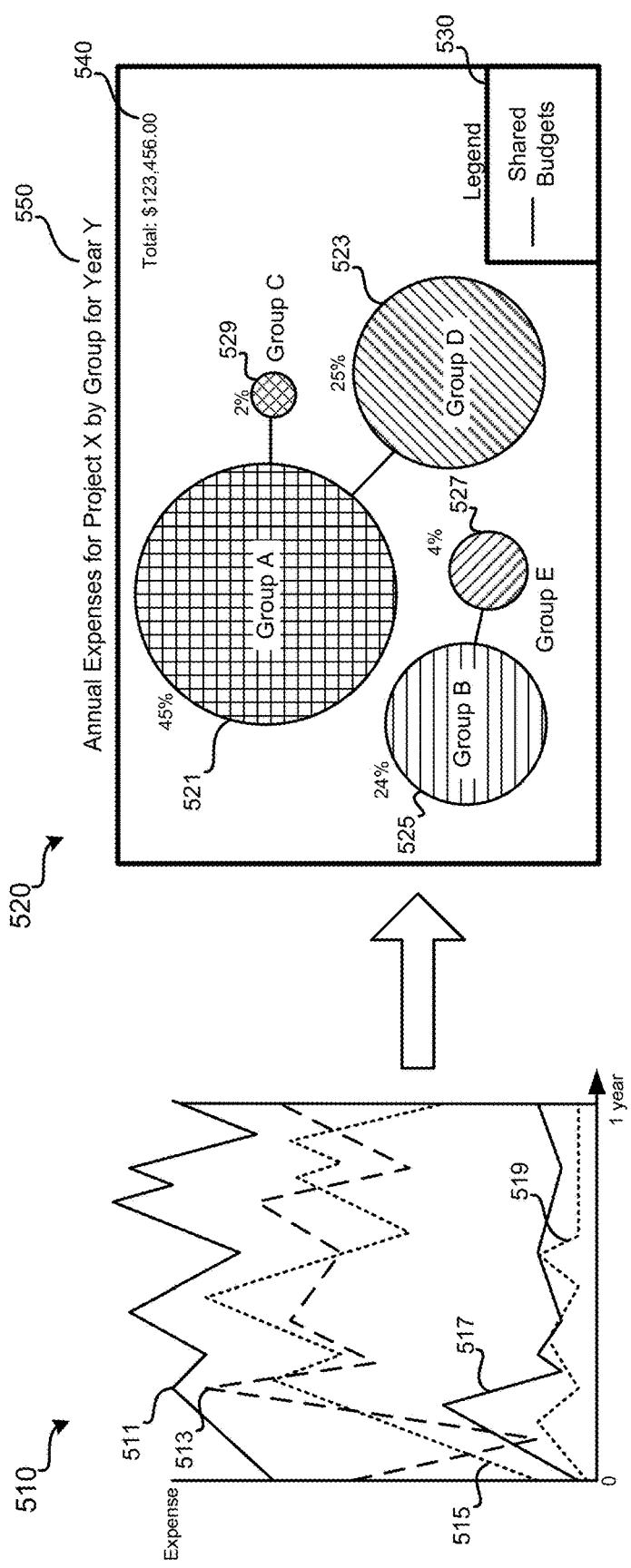
FIG. 5 illustrates previously generated and alternative visual analytics according to various embodiments of the present disclosure.

FIG. 5 is another illustrative example scenario in which requested changes to the dimensions of previously generated visual analytic 510 may result in the automatic determination of a visual analytic pattern that may better illustrate aspects of the underlying analytic data. In FIG. 5, visual 510 includes a five line graphs, 511, 513, 515, 517 and 519 that represent the expenses of corresponding contributing groups to a particular project. While this view of the analytic data shown in the visualization of previously generated visual analytic 510 may be useful to some users for some purposes, some users may wish to add dimensions or labels to the visualizations to increase the ease with which the information can be understood. Accordingly, a user may request to add dimensions to the visualization that indicate which groups share budgets, the total expenses of all the groups for the project, and the relative percentage expenses attributed to each of the groups. While it may be possible to label the line graph of previously generated visual analytic 510 to show such information, it may not be the most effective way to portray such details. The addition of the additional numeric or labeled data may produce disarray in an already cluttered visual analytic. Accordingly, in some embodiments, the request to change the dimensions of the previously generated visual analytic 510 may result in the determination of an alternative visual analytic pattern that defines a specific type, format, layout, etc., of visualization that better illustrates the information the user is requesting.

Visual analytic 520 depicts an example visualization of underlying analytic data resulting from the application of the alternative visual analytic pattern determined based on the analysis of the requested changes in dimensions to the previously generated visual analytic 510.

In the specific example of visual analytic 520, the alternative visual analytic pattern defines a bubble graph that illustrates the relative magnitude of the expenses of various groups using different sized circles 521, 523, 525, 527, and 529 with different shading patterns. While circles are illustrated in this particular example, other shapes may also be used. In addition, the alternative visual analytic pattern determined in response to changes in dimensions of the previously generated visual analytic 510 may include specifications to label various aspects of the visual analytic 520. For example, the alternative visual analytic pattern may indicate that each circle 521-529 should be labeled with an corresponding group identifier and be visually associated with a numeric percentage value of the total expense amount 540 that is included in a specific location of the visual analytic 520. In addition, the alternative visual analytic pattern may also define that legend 530 should be included in a specific location of the visual analytic 520 to show or explain that the connecting lines in between various pairs of the circles 521-529 indicate groups that share a budget. The alternative visual analytic pattern may also indicate that the visual analytic 520 include a title 550 that explains the subject and purpose of the visualization.

In some instances, such as that shown in the change from previously generated visual analytic 510 to visual analytic 520, the report definition that produced underlying analytic data used to generate the visual analytic 510 may not include all the analytic data needed by the alternative visual analytic pattern. In the example shown, the analytic data used by the visual analytic pattern to generate the visual analytic 510 may not include the percentage values, the total expense amount 540, or any of the indications of shared budgets. Because the alternative visual analytic pattern would need additional analytic data, embodiments the present disclosure include modifying the original report definition. The modifications to the original report definition may be made according to the alternative visual analytic pattern for the visual analytic 520 to generate a modified report definition. The modified report definition can then be applied to the underlying data to generate the necessary analytic data that may be used by the alternative visual analytic pattern to generate the visual analytic 520.

System for Automatically Modifying Visual Analytics

Figure 6:
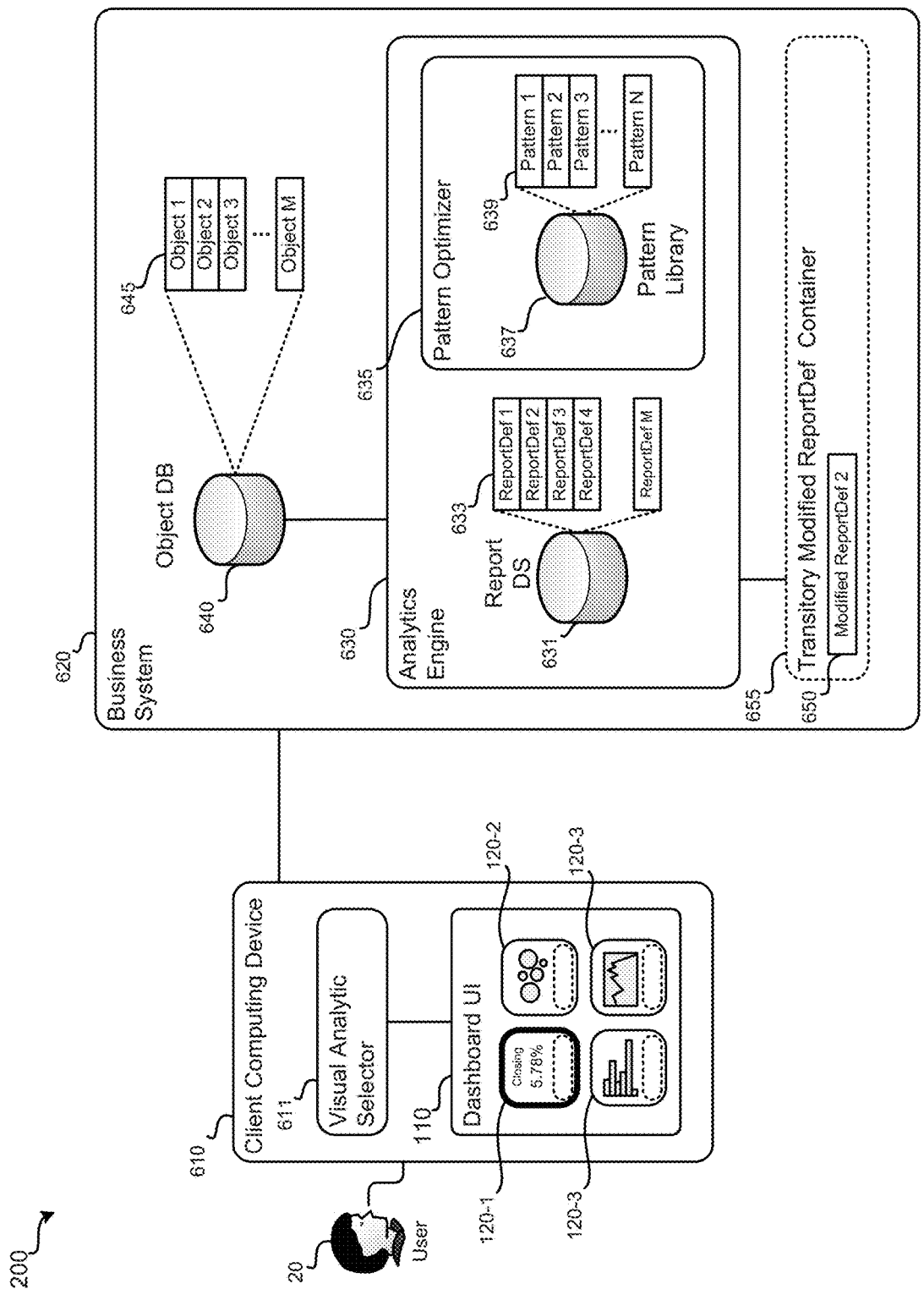
FIG. 6 is a block diagram of a system for automatically determining alternative visual analytics in response to user input to change dimensions, according to embodiments of the present disclosure.

FIG. 6 illustrates a system 600 for determining alternative visualizations in response to requests for changing the dimensions of previously generated visual analytics, according to various embodiments of the present disclosure. System 600 may include a business system 620 in electronic communication with a remote client computing device 610. The client computing device 610 may include various types of mobile computing devices and personal computers, such as smart phones, tablet computers, laptop computers, desktop computers and the like. The client computing device 610 may execute code for generating one or more user interfaces for accessing, interacting with, and controlling various aspects and functionality of the business system 620. In one embodiment, the client computing device 610 may include a dashboard UI 110 that includes a framework for displaying multiple visual analytics 120 generated by the analytics 630. The client computing device 610 may also include a visual analytic selector 611 for requesting changes to, among other attributes, the dimensions of the visualization of the visual analytics 120. In some embodiments, the visual analytic selector 611 may include user interfaces similar to those illustrated in FIG. 2 as the dimension editor 210 or the alternative pattern UI 310 in FIG. 3. The user 20, using the client computing device 610, may request that the dimensions of one or more of the visualizations of the visual analytics 120 be changed to include fewer, more, or different dimensions. The client computing device 610 can then send the user input indicating the request for a change in dimensions to the business system 620.

In the business system 620, the analytics engine 630 can access business data contained in the business object database 640 to generate one or more visual analytics by executing the analytical operations of one or more report definitions 633 in the report data store 631 on one or more business objects 645. In some embodiments, the analytics engine 630 can use the pattern optimizer 635 to access one or more of the visual analytic patterns 639 stored in the pattern library 637. As used herein, the report definitions 633 may include a set of analytical operations operable on business data contained in one or more of the business objects 645. The resulting report from operating a report definition 633 on a corresponding or bound business object 645 contains analytic data. The specific analytical operations of a particular report definition 633 may include specifications of particular dimensions by which the underlying business object 645 is analyzed. For example, the analytical operations for a report definition 633 may include specifications that the target business object 645 be filtered for particular a dimension, aggregated across another specific dimension, for a particular time dimension (e.g., sales tax expenses across multiple states for a given fiscal year).

Using the analytic data, the analytics engine 630 may generate a visual analytic 120 that includes a visualization of the analytic data according to a visual analytic pattern 639. As used herein, each visual analytic pattern 639 may include the specifications for content, format, visualization type, layout, and the like, for particular visual analytic 120 that may be sent to and displayed on the client computing device 610. Accordingly, a visual analytic pattern 639 may include the definition of specific dimensions of a corresponding visualization of the associated analytic data. In some embodiments, the dimensions of analytic data resulting from the application of a specific report definition 633 to a specific business object 645 can be used by the analytics engine 630 to match the analytic data to one or more visual analytic patterns 639.

Once an initial visual analytic 120 is presented to user 20 in the framework of the dashboard UI 110, the client computing device 610 may receive user input indicating a request to change the dimension of one or more of the visual analytics 120. The client computing device 610 may send the request to change the dimensions of the visual analytics 120 to the business system 620. The analytics engine 630 may receive and analyze the request. The analytics engine may analyze the request to change the dimensions of a specific visual analytic 120 relative to the dimensions of the original visual analytic 120. Accordingly, the analytics engine 630 may determine whether the user is requesting more, fewer, or different dimensions be shown in the visualization of the visual analytic 120. Based on the analysis of the request to change the dimensions of a visualization, the analytic engine may reference visual analytic patterns 639 stored in the pattern library 637 to determine an appropriate match. In some embodiments, the pattern library 637 may include a mapping between specific sets of dimensions and corresponding suitable visual analytic patterns 639.

If the analytics engine 630 determines a suitable alternative visual analytic pattern 639, then it can then determine whether the analytic data resulting from the original report definition 633 applied to the initial business object 645 includes the dimensions of analysis requested by the user 20. If the original analytic data included sufficient dimensions of analysis, then the analytics engine 630 can generate a modified visual analytic 120 based on the original analytic data and the alternative visual analytic pattern 639. However, if the analytics engine 630 determines that the original analytic data does not include the dimensions of analysis requested by the user 20, it can modify the original report definition 633 to include requested dimensions. In one embodiment, modifying the report definitions 633 may include generating a modified report definition 650.

The modified report definition 650, that includes analytical operations corresponding to the newly requested dimensions, can be stored in a transitory modified report definition container 655 within the business system 620 or analytics engine 630. The contents of transitory modified report definition container 655 do not persist from one login session to the next. Accordingly, the next time a user 20 uses the client computing device 610 to access the business system 620, the modified report definition 650 may not be available. The transitory nature of the modified report definitions 650 prevents the contents of the report database 631 from becoming overpopulated with potentially ill-conceived alterations to carefully designed report definitions 633.

The analytic engine may generate modified analytic data resulting from the application of the modified report definition 650 to the corresponding business object 645. The analytics engine 630, or the pattern optimizer 635, may then generate a corresponding modified version of visual analytic 120 based on the determined alternative visual analytic pattern 639 and the modified analytic data. The modified visual analytic thus includes the requested change in dimensions. The modified visual analytic may then be sent from the business system 620 to the client computing device 610 to be displayed in the existing dashboard UI 110.

Each of the components and functionality described in reference to system 600 of FIG. 6 may be implemented as a combination of hardware, firmware, and software. Accordingly, the business system 620 may be implemented in a centralized server computer or in a distributed system of physical and virtual computer systems. For example, the business system 620 may be implemented in a cloud computing environment. In addition, although the analytics engine 630, pattern optimizer 635, and the transitory modified report definition container 650 are illustrated as being part of the business system 620, embodiments of the present invention may also include systems in which each component is implemented in a separate physical or virtual computing device that are in communication with one another through one or more electronic communication media or protocols.

Method for Automatically Modifying Visual Analytics

Figure 7:
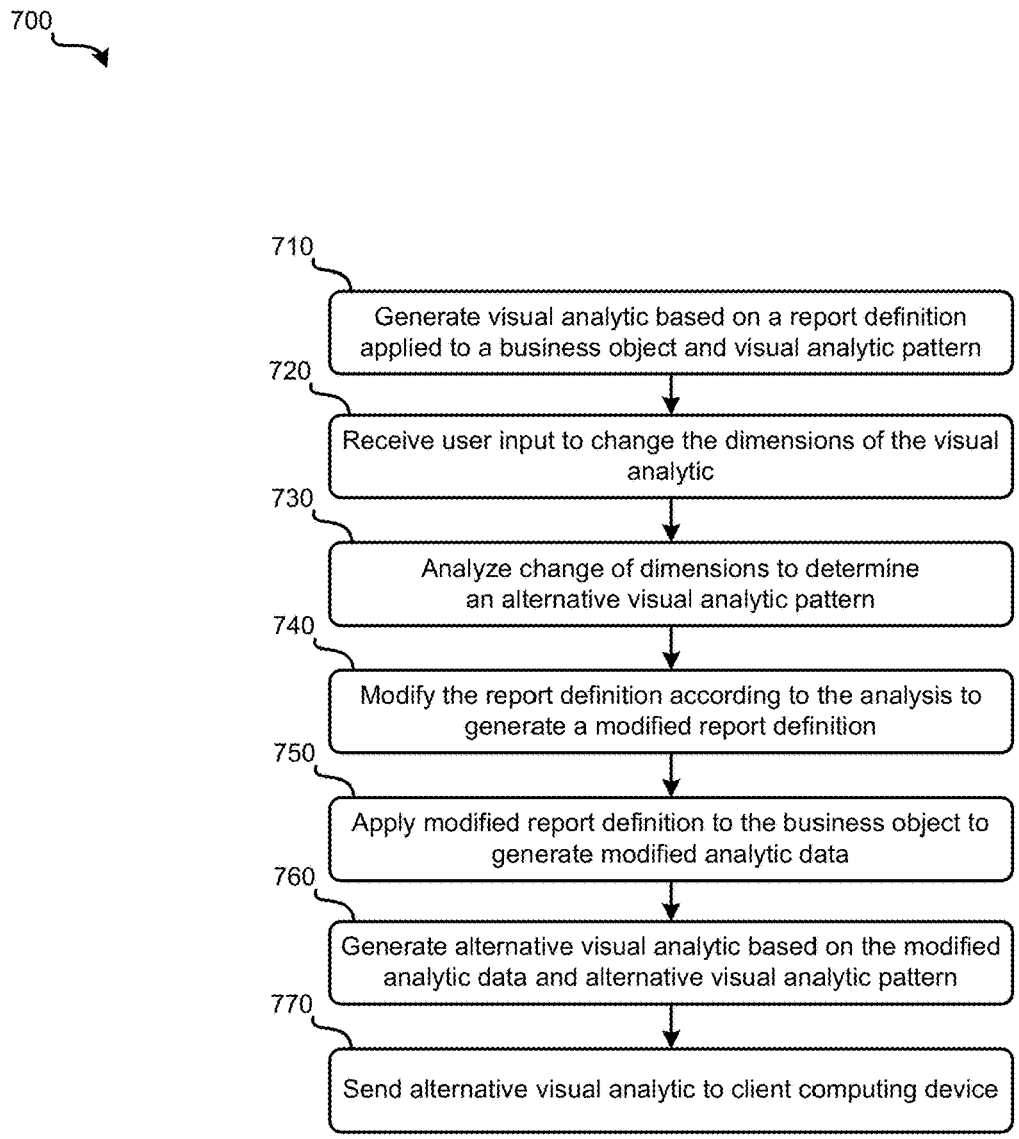
FIG. 7 is a flowchart of a method for automatically determining alternative visual analytics in response to user input to change dimensions, according to embodiments of the present disclosure.

FIG. 7 illustrates a method 700 for automatically determining and generating a visual analytic 120 that includes changes in the dimensions of the constituent visualization 125 requested by a user. In one embodiment, the method can begin in action 710, in which a business system 520 generates a visual analytic 120 based on the analytic data resulting from report definitions 533 being applied to a specific business object 545. In some embodiments, the method 700 may be initiated after a business system 520 has generated a number of visual analytics 120 that may be displayed on a remote client computing device 510. Accordingly, in such embodiments, in which the business system 520 has previously generated one or more visual analytics 120, the method 700 may begin at action 720, in which the business system 520 receives a user input to change the dimensions of one or more of the visual analytics. In such embodiments, a business system 520 may receive user input from a client computing device executing a dashboard UI 110 that includes functionality for receiving a request to change dimensions.

In action 730, the business system 520 may analyze the requested change of dimensions to determine an alternative visual analytic. Analyzing the request may include determining the specific dimensions that are included in the request, the number of dimensions, and the original analytic data from which the original visual analytic was generated. Once an alternative visual analytic pattern is determining, including specifications for a visualization type with the capability for suitably displaying the requested dimensions, business system 520 may analyze the original analytic data to determine if sufficient dimensions of analysis exist. If the original analytic data included sufficient dimensions of analysis, then the business system may generate the modified visual analytic according to the alternative visual analytic pattern and the original analytic data.

In other embodiments, analysis of the original analytic data may reveal that it includes insufficient dimensions of analysis (i.e., fewer or different dimensions that those requested), the business system 520 may modify the original report definition 535 to generate a modified report definitions according to the analysis, in action 740. The modified report definition 533 may include modified or additional analytical operations that result in modified analytic data with dimensions corresponding to the alternative visual analytic pattern. The business system 520 may then apply the modified report definition to the original business object to generate modified analytic data, in action 750.

In action 760, the business system 520 may then generate the alternative visual analytic based on the modified analytic data and the alternative visual analytic pattern. Once the alternative visual analytic with the requested change to the dimensions is generated, the business system 520 may then send the alternative visual analytic to the client computing device 510, in action 770.

Embodiments of the present disclosure include systems and methods automatically analyzing the content of a dashboard UI 110 to generate suggestions of alternative possible visual representations.

Figure 8:
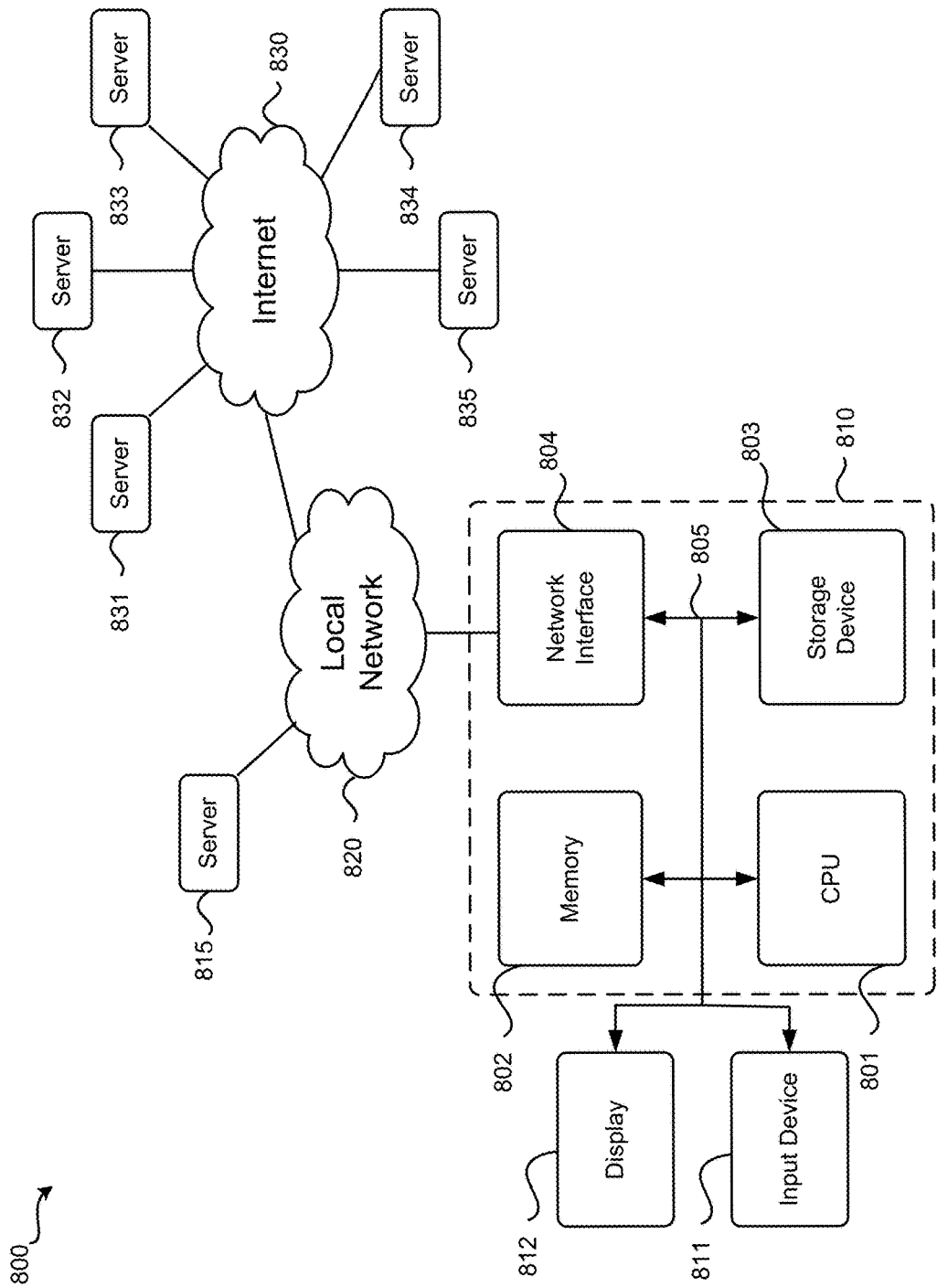
FIG. 8 is block diagram of computer systems that can be used to implement various embodiments of the present disclosure.

FIG. 8 illustrates an example computer system and networks that may be used to implement one embodiment of the present disclosure. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including instructions for performing the techniques described above. This memory may also be used for storing temporary variables or other intermediate information during execution of instructions to be executed by processor 801. Possible implementations of this memory may be, but are not limited to, random access memory (RAM), read only memory (ROM), or both. A storage device 803 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 810 may be coupled via the same or different information bus, such as bus 805, to a display 812, such as a cathode ray tube (CRT), touchscreen, or liquid crystal display (LCD), for displaying information. An input device 811 such as a keyboard and/or mouse is coupled to a bus for communicating information and command selections from the user to processor 801. The combination of these components allows the user to communicate with the system.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 804 sends and receives electrical, electromagnetic, or optical signals that carry digital data streams representing various types of information.

Computer system 810 can send and receive information, including messages or other interface actions, through the network interface 804 to an Intranet or the Internet 830. In the Internet example, software components or services may reside on multiple different computer systems 810 or servers 831 across the network. Software components described above may be implemented on one or more servers. A server 831 may transmit messages from one component, through Internet 830, local network 820, and network interface 804 to a component or container on computer system 810, for example. Software components of a composite application may be implemented on the same system as other components, or on a different machine than other software components. This process of sending and receiving information between software components or one or more containers may be applied to communication between computer system 810 and any of the servers 831 to 835 in either direction. It may also be applied to communication between any two servers 831 to 835.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method, executable by a computer system, comprising:

providing to a user, through a graphical user interface (GUI) of a client computing device, an initial visual analytic comprising a first visualization of multi-dimensional analytic data categorized based on a first set of dimensions resulting from execution of a report definition on a business object stored in a computer system, wherein the report definition comprises a first plurality of analytical operations;

providing to the user, through the GUI, a selection of a second set of dimensions for the initial visual analytic, wherein the first and second sets of dimensions differ by at least one dimension;

in response to the selection by the user, referencing a pattern library storing a plurality of visual analytic patterns and a set of mappings to determine a visual analytic pattern from the plurality of visual analytic patterns, wherein each mapping in the set of mappings maps a particular set of dimensions to a different type of visual analytic pattern in the plurality of visual analytic patterns, the determined visual analytic pattern specifies a particular visual analytic of a particular type of visualization of the multi-dimensional analytic data categorized by the second set of dimensions;

modifying the report definition based on the determined visual analytic pattern to generate a modified report definition, wherein the modified report definition comprises a second plurality of analytical operations;

executing the modified report definition on the business object to generate modified multi-dimensional analytic data; and generating and displaying to the user, through the GUI, an alternative visual analytic based on the determined visual analytic pattern, the alternative visual analytic comprising a second visualization of the modified multi-dimensional analytic data categorized based on the second set of dimensions.

2. The method of claim 1, wherein the UI control comprises a plurality of selectable options, each selectable option in the plurality of selectable options corresponding to a particular predefined set of dimensions, wherein receiving the selection of the second set of dimensions for the initial visual analytic comprises receiving a selection of a selectable option in the plurality of selectable options that corresponds to the second set of dimensions.

3. The method of claim 1 further comprising sending the alternative visual analytic to the client computing device in a format compatible with a dashboard user interface that provides a framework for a plurality of visual analytics comprising a plurality of visualizations of analytic data of a plurality of business objects in a business system.

4. The method of claim 1, wherein the modified report definition is transitory and is not persistent in the computer system storing the business object.

5. The method of claim 1, wherein the modified multi-dimensional analytic data comprises dimensions different from dimensions in the multi-dimensional analytic data resulting from the execution of the report definition on the business object.

6. A non-transitory computer readable medium comprising instructions, that when executed by a computer processor of a computer system cause the computer processor to be configured for:

providing to a user, through a graphical user interface (GUI) of a client computing device, an initial visual analytic comprising a first visualization of multi-dimensional analytic data categorized based on a first set of dimensions resulting from execution of a report definition on a business object stored in a computer system, wherein the report definition comprises a first plurality of analytical operations;

providing to the user, through the GUI, a selection of a second set of dimensions for the initial visual analytic, wherein the first and second sets of dimensions differ by at least one dimension;

in response to the selection by the user, referencing a pattern library storing a plurality of visual analytic patterns and a set of mappings to determine a visual analytic pattern from the plurality of visual analytic patterns, wherein each mapping in the set of mappings maps a particular set of dimensions to a different type of visual analytic pattern in the plurality of visual analytic patterns, the determined visual analytic pattern specifies a particular visual analytic of a particular type of visualization of the multi-dimensional analytic data categorized by the second set of dimensions;

modifying the report definition based on the determined visual analytic pattern to generate a modified report definition, wherein the modified report definition comprises a second plurality of analytical operations;

executing the modified report definition on the business object to generate modified multi-dimensional analytic data; and generating and displaying to the user, through the GUI, an alternative visual analytic based on the determined visual analytic pattern, the alternative visual analytic comprising a second visualization of the modified multi-dimensional analytic data categorized based on the second set of dimensions.

7. The non-transitory computer readable medium of claim 6, wherein the UI control comprises a plurality of selectable options, each selectable option in the plurality of selectable options corresponding to a particular predefined set of dimensions, wherein receiving the selection of the second set of dimensions for the initial visual analytic comprises receiving a selection of a selectable option in the plurality of selectable options that corresponds to the second set of dimensions.

8. The non-transitory computer readable medium of claim 6, wherein the instructions further cause the process to be configured for sending the alternative visual analytic to the client computing device in a format compatible with a dashboard user interface that provides a framework for a plurality of visual analytics comprising a plurality of visualizations of analytic data of a plurality of business objects in a business system.

9. The non-transitory computer readable medium of claim 6, wherein the modified report definition is transitory and is not persistent in the computer system storing the business object.

10. The non-transitory computer readable medium of claim 9, the modified multi-dimensional analytic data comprises dimensions different from dimensions in the multi-dimensional analytic data resulting from the execution of the report definition on the business object.

11. A system comprising:
a computer processor; and
a non-transitory computer readable medium coupled to the processor and comprising instructions, that when executed by the computer processor cause the computer processor to be configured to:

provide to a user, through a graphical user interface (GUI) of a client computing device, an initial visual analytic comprising a first visualization of multi-dimensional analytic data categorized based on a first set of dimensions resulting from execution of a report definition on a business object stored in a computer system, wherein the report definition comprises a first plurality of analytical operations;

provide to the user, through the GUI, a selection of a second set of dimensions for the initial visual analytic, wherein the first and second sets of dimensions differ by at least one dimension;

in response to the selection by the user, reference a pattern library storing a plurality of visual analytic patterns and a set of mappings to determine a visual analytic pattern from the plurality of visual analytic patterns, wherein each mapping in the set of mappings maps a particular set of dimensions to a different type of visual analytic pattern in the plurality of visual analytic patterns, and the determined visual analytic pattern specifies a particular visual analytic of a particular type of visualization of the multi-dimensional analytic data categorized by the second set of dimensions;

modify the report definition based on the determined visual analytic pattern to generate a modified report definition, wherein the modified report definition comprises a second plurality of analytical operations;

execute the modified report definition on the business object to generate modified multi-dimensional analytic data; and generate and display to the user, through the GUI, an alternative visual analytic based on the determined visual analytic pattern, the alternative visual analytic comprising a second visualization of the modified multi-dimensional analytic data categorized based on the second set of dimensions.

12. The system of claim 11, wherein the UI control comprises a plurality of selectable options, each selectable option in the plurality of selectable options corresponding to a particular predefined set of dimensions, wherein receiving the selection of the second set of dimensions for the initial visual analytic comprises receiving a selection of a selectable option in the plurality of selectable options that corresponds to the second set of dimensions.

13. The system of claim 11, wherein the instructions further cause the computer processor to be configured to send the alternative visual analytic to the client computing device in a format compatible with a dashboard user interface that provides a framework for a plurality of visual analytics comprising a plurality of visualizations of analytic data of a plurality of business objects in a business system.

14. The system of claim 11, wherein the modified report definition is transitory and is not persistent in the system storing the business object.

15. The system of claim 11, wherein the modified multi-dimensional analytic data comprises dimensions different from dimensions in the multi-dimensional analytic data resulting from the execution of the report definition on the business object.

* * * * *